Figure 1:
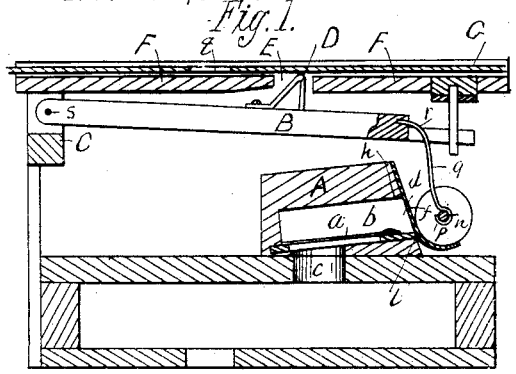

(No Model.)

J. P. RICHARDSON.
VALVE FOR REED ORGANS.

No. 261,483. Patented July 18, 1882.

Witnesses:

Inventor.
John P. Richardson,
By Brown Bros.
Attorneys

United States Patent Office.

JOHN P. RICHARDSON, OF CAMBRIDGE, MASSACHUSETTS.

VALVE FOR REED-ORGANS.

SPECIFICATION forming part of Letters Patent No. 261,483, dated July 18, 1882.

Application filed March 18, 1882. (No model.)

*To all whom it may concern:*

Be it known that I, JOHN P. RICHARDSON, of Cambridge, in the county of Middlesex and State of Massachusetts, have invented certain new and useful Improvements in Valves for Reed-Organs, of which the following is a full, clear, and exact description.

This invention relates to reed and pipe organs, mechanical musical instruments—such as the "orguinette" or "organina," so known—and all other musical instruments using reeds, pipes, or other sound devices arranged to be sounded by the passage of air through them; and it pertains particularly to the valves and their construction and arrangement for opening and closing the reeds, &c., to the passage of air through them.

This improvement in the valves, in substance and principally, consists, first, of a valve for an air-passage leading to a reed, &c., made of a strip of flexible material of a character to prevent the passage of air through it, and to be capable of being rolled up and unrolled—such as leather—and at one end made stationary, and of a roller to which the other end of said valve is secured, in combination with an arm from which said roller is suspended, so as to rotate freely thereon, and which is arranged through suitable connecting mechanism to move said roller forward and backward over said air-passage in a manner to roll said valve upon and unroll it from the roller, and all so that in one of said rolling movements the valve will be made to cover and thus to close said air-passage, and in the other thereof to uncover and thus to open said air-passage, and so as to be held, as desired, in either of such positions; second, in the combination, with a roller and a valve, constructed and arranged as described, to roll the valve upon and unroll it from the roller, of an arrangement of the roller to secure a pressure thereof in the direction to confine it to its work and to its bearing upon the surface over which it moves in so rolling up and unrolling the valve; third, in the combination, with a roller and a valve, constructed and arranged as above described, to roll the valve upon and unroll it from the roller, of an arrangement of the roller to secure a pressure or force thereto in a direction to cause it to return after the force which was applied to move it has been withdrawn; fourth, in the combination, with a roller and a valve, constructed and arranged as described, to roll the valve upon and unroll it from the roller, of an arrangement of the roller to secure a pressure thereof both in the direction to confine it to its work and to its bearing upon the surface over which it moves in so rolling up and unrolling the valves, and in a direction to cause it to return after the force which was applied to move it has been withdrawn.

In the accompanying plate of drawings are shown various modes of carrying out the present invention, and as illustrated a valve such as described is shown in combination with an air-passage leading to a reed and arranged to be operated, as described, in one case by the movements of an organ-key and in the other case by and through the travel of the perforated and unperforated portions of a sheet of paper or other suitable material in proper relation to a lever suitably connected to the valve to operate it, as described, by and through the movements of such lever because of the perforated and unperforated portions of said paper strip.

Figure 2:
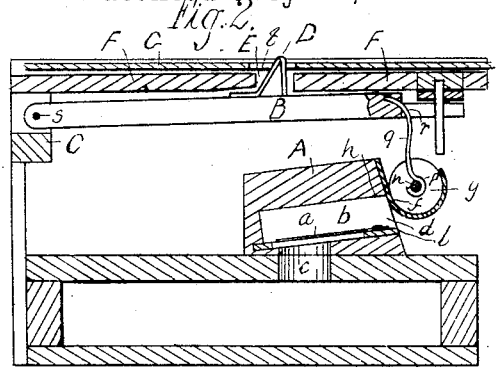
Figure 3:
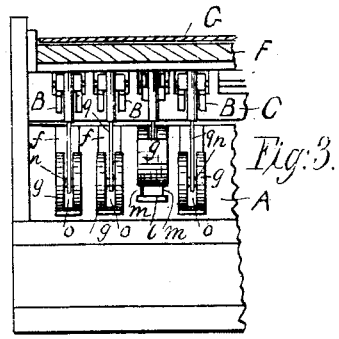
Figure 4:
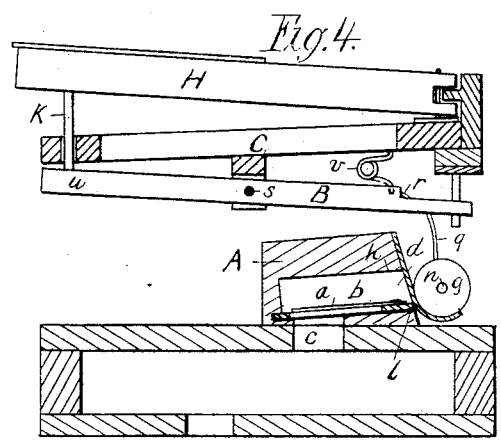
Figure 5:
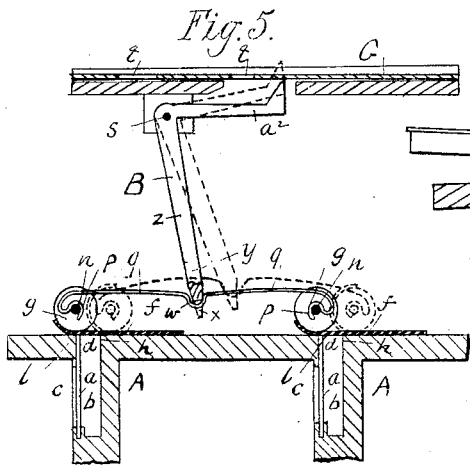
Figure 6:
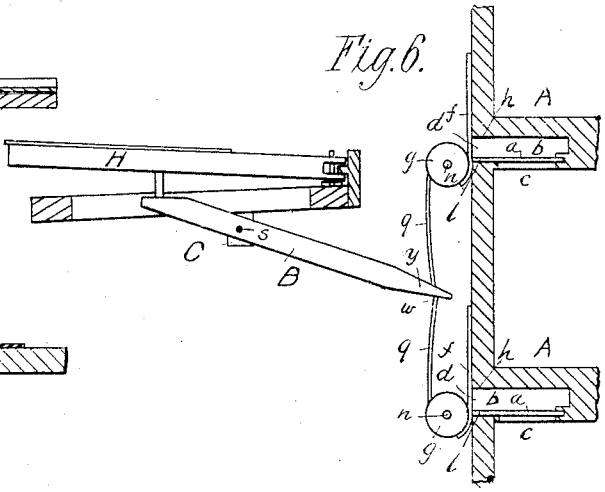

Figures 1 and 2 are similar vertical sections, and in each is shown the present improved valve and arrangement thereof. In Fig. 1 the valve is closed and in Fig. 2 it is opened, and it is adapted to be operated from the movements of a lever because of the travel of a perforated strip of paper in proper relation thereto. Fig. 3 is an elevation of valves and operating-levers such as shown in Figs. 1 and 2 at the ends of the air-passages to the reeds at which the valves are arranged, and shows the valve to one of said air-passages as opened and the other as closed and the perforated strip and its raceway in vertical cross-section. Fig. 4 is in part a vertical section and side elevation, showing the present improved valve and arrangement thereof (the valve being closed) and as adapted to be operated from the movements of an organ-key. Fig. 5 is a vertical section substantially illustrating two of the present improved valves and arrangement thereof as adapted to be operated from one lever because of the travel of a perforated strip of paper in proper relation thereto; and Fig. 6 is a side elevation substantially, and in all respects substantially similar to Fig. 5, except that the valves are arranged to be operated by the movement of an organ-key.

In the drawings, a represents an organ-reed, and b its chamber, of a reed-board, A.

The reed-chamber b is in communication by a passage, c, with any suitable arrangement of wind mechanism.

d is the outer end of the reed-chamber b, making an air-passage thereto, and which, when opened, allows air to pass through the reed-chamber and secure the sounding of the reed therein, and when closed stops such passage of the air, and as a consequence the sounding of the reed, as is common in musical instruments using reeds as the sound devices.

The face of the reed-board A, at the air-passage d in Figs. 1, 2, 3, and 4, is more or less perpendicular, and f is the valve thereto. This valve f is made of a strip of flexible material of a character to prevent the passage of air through it and to be capable of being rolled up and unrolled—such, for instance, as leather.

The valve f is of a width and length greater than the width and length of the air-passage d, and it has one end fastened by glue or any other suitable means to the reed-board A, and beyond the end wall h of the air-passage d, and it has its other end secured by glue or any other suitable means to the periphery or edge of a roller, g, and the length of the valve f between such two ends, fastened as described, is sufficient for the valve to substantially extend over and cover of itself the whole length of the air-passage d, and preferably to project slightly beyond the end wall l of said air-passage which is opposite to its end wall h.

The valve f, when covering the length of the air-passage d, as described, also covers and closes it across its width and projects beyond and over each of its side walls, m.

The roller g is in two parts, joined together by a common axial pin, n, so as to leave an open space, o, between their ends toward each other as so joined; and, as shown in Figs. 1, 2, 3, and 4, the roller is suspended by said axial pin n between its said parts in the hook end p of a spring-arm, q, and so as to freely turn therein.

The spring-arm q at its end r, opposite to its hook end p, is attached to one end of a horizontal lever, B, hung upon a fulcrum-pin, s, of a stationary rail, C, so as to swing thereon in a vertical plane, and all so that by the swing of said lever upon its fulcrum in either direction said roller will be made to roll along the length of the air-passage d, and in so rolling in the one direction roll the valve-strip f around and upon it sufficiently to uncover and thus open said air-passage to the passage of air through it, and in the other direction unroll said valve-strip from the roller, and, placing it along and over said air-passage, close it to the passage of air through it.

In both movements of the roller and valve-strip above described the spring of the spring carrying-arm q holds and confines the valve-strip f and roller g to close contact with the face of the reed-board and said air-passage, while at the same time the roller is free to rotate.

The operating-lever B, as shown in Figs. 1, 2, and 3, has its fulcrum s at one end, and between its two ends it has a wedge-shaped upward projection, D, which is opposite a vertical opening, E, through a horizontal platform, F, making the raceway for the travel in any suitable manner of a perforated strip of paper, G, from end to end thereof, and in which paper are parallel rows of perforations t, one in line with said projection D of lever B, and all as common in mechanical musical instruments—such as, for instance, of the class known as the "organina" in the trade.

The operating-lever B, as shown in Fig. 4, has its fulcrum s between its two ends.

K is a vertical pin resting upon the end u of lever B, and H is an organ-key resting upon said pin K and otherwise arranged as usual.

As the lever B is constructed and arranged in Figs. 1, 2, and 3 the spring of the spring-arm q, which carries the roller g, acts in a direction to press said lever B upward, and thus keep its projection D in close contact with the under side of the unperforated portions of the music-strip G as the same pass by and over said projection, and to cause said projection to enter and remain in the perforations t of the strip as the same pass by and over said projection, and to move out of such peforations from time to time to and upon an unperforated portion. In this manner the lever B is operated, and thus through it the valve, connected to it as described, is at and along an unperforated portion of the paper-strip held closed, and at and along a perforated portion of the paper-strip held opened, and as the lever B passes from one to the other it is opened or closed according as it is moved from an unperforated to a perforated portion, or vice versa.

As the lever B is constructed and arranged in Fig. 4 a spring, v, which bears down upon it, acts to force the end of the lever B, to which the arm q is connected, downward and to raise its opposite end, and thus to raise the front or finger end of the key. On the depression of the finger end of the key the valve is opened and so held as long as the key is depressed, and on the release of the pressure on the finger end the key is lifted by the spring v to its normal position of rest, and at the same time the valve closed and so held until the key is again depressed, when it is opened as before, and so on.

In Fig. 5 the operating-lever B is arranged to work in connection with the travel of a perforated strip of paper, substantially the same as the lever B works in Figs. 1, 2, and 3. In Fig. 6 the operating-lever is arranged to work in connection with an organ-key, H, substantially the same as the lever B works in Fig. 4. In both Figs. 5 and 6, however, two valves, $f$, are combined and operated with one operating-lever B.

Each valve $f$ opens and closes a separate air-passage, $d$, to a reed-chamber, $b$, and each is attached to the face of the reed-board and to a roller, $g$, all as has been described, and in the rolling up and unrolling of each valve each roller travels in the same direction in each movement.

In each figure the two rollers are suspended each from separate ends of a common spring-arm, $q$, the same as described for the single roller of Figs. 1 to 4, inclusive, and this spring-arm $q$ midway of its length has a loop, $w$, which receives the notch $x$ at and across one end, $y$, of the operating-lever B, and all in a manner for the spring-arm in each of its parts on opposite sides of the so-connected lever to press upon the valve and roller in a direction to hold them both closely to their bearings upon the reed-board, and both to press against the lever in the direction of its length, and thus, by having its fulcrum-pin $s$ placed at one and the proper side, either right or left, as the case may be, of the location of the said connection between the lever B and spring-arm $q$, cause said lever at its other end either to press against the perforated paper and enter into the perforations of the same, and otherwise, as described for the lever B, arranged as in Figs. 1, 2, and 3, or to raise the finger end of the key, and otherwise as described for the lever B, arranged as in Fig. 4.

The lever B of Fig. 5, for the operation above described, is made of angular shape, and its fulcrum is at the angle of its two arms, $z$ $a^2$. The one arm, $z$, makes the connection with the spring-arm, and it is vertical, and the other arm, $a^2$, is horizontal, and through it the lever has its bearing upon and makes its entrance into a perforation of the perforated paper strip, as described.

The rollers of the valves in Fig. 5 travel in a horizontal plane over their respective air-passages $d$.

The lever B of Fig. 6 for the operation of it (which has been described) is arranged and connects with the key-lever, substantially as the lever B of Fig. 4, and the rollers of the valves travel in a vertical plane over their respective air-passages.

The valve-roller $g$, in lieu of being made in two parts joined together, all as described, may be made in one piece and grooved sufficiently to secure and axial bearing $n$ for the hook end $p$ of the spring carrying-arm for the roller. Again, the roller may be suspended from an arm, $q$, in other obvious ways than that particularly described.

The hanging of the rollers $g$ from hook ends $p$ of their carrying-arms $q$ plainly enables them to be readily attached and detached, and, when attached, to act in every respect desired.

Having thus described my invention, what I claim, and desire to secure by Letters Patent, is—

1. In reed and other organs, an air-passage leading to a reed, a valve for said air-passage made of a strip of flexible material and fixed at one end, and a roller having the other end of said valve secured to it, in combination with an arm from which said roller is suspended so as to rotate, and mechanism constructed and arranged to act upon said carrying-arm for the roller in a manner to move the roller forward and backward over said air-passage, all substantially as and for the purpose described.

2. In reed and other organs, an air-passage leading to a reed, a valve for said air-passage made of a strip of flexible material and fixed at one end, and a roller having the other end of said valve secured to it, in combination with an arm from which said roller is suspended so as to rotate, and which is constructed and arranged to exert a yielding pressure in relation to said roller and its movement, and mechanism constructed and arranged to act upon said carrying-arm for the roller in a manner to move the roller forward and backward over said air-passage, all substantially as and for the purpose described.

3. In reed and other organs, an air-passage leading to a reed, a valve for said air-passage made of a strip of flexible material and fixed at one end, and a roller having the other end of said valve secured to it, in combination with an arm from which said roller is suspended so as to rotate, and which is constructed and arranged to automatically move said roller in one direction, and mechanism constructed and arranged to act upon said carrying-arm for the roller in a manner to move said roller in one direction and to allow it to be moved in an opposite direction over said air-passage, all substantially as and for the purpose described.

4. In a reed and other organs, an air-passage leading to a reed, a valve for said air-passage made of a strip of flexible material and fixed at one end, and a roller having the other end of said valve secured to it, in combination with an arm from which said roller is suspended so as to rotate, and which by its spring exerts a yielding presure in relation to said roller and its movement, and to automatically move said roller in one direction, and mechanism constructed and arranged to act upon said carrying-arm for the roller in a manner to move said roller in one direction and to allow it to be moved in an opposite direction over said air-passage, all substantially as and for the purpose described.

5. In a reed or other organ, an air-passage, $d$, leading to a reed, a valve, $f$, for said air-passage made of a flexible material and fixed at one end, a roller, $g$, having the other end of valve $f$ secured to it, in combination with an arm, $q$, having a hook end, $p$, for the suspension of the roller $g$, and with a lever, B, to which said arm $q$ is attached, arranged to be operated, all substantially as described, for the purpose specified.

6. In combination with a roller, $g$, having an axial pin, $n$, and an arm, $q$, having a hook end, $p$, in which said roller is arranged to rotate, an air-passage, $d$, leading to a reed, $b$, &c., of a reed or other organ, all substantially as described, for the purpose specified.

In testimony whereof I have hereunto set my hand in the presence of two subscribing witnesses.

JOHN P. RICHARDSON.

Witnesses:
EDWIN W. BROWN,
WM. S. BELLOWS.